United States Patent
Headley

(10) Patent No.: US 10,263,383 B2
(45) Date of Patent: Apr. 16, 2019

(54) GAIN FIBER FOR HIGH POWER LASERS AND AMPLIFIERS

(71) Applicant: OFS Fitel, LLC, Norcross, GA (US)

(72) Inventor: Clifford E Headley, Flemington, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/874,582

(22) Filed: Jan. 18, 2018

(65) Prior Publication Data

US 2018/0205196 A1    Jul. 19, 2018

Related U.S. Application Data

(60) Provisional application No. 62/448,279, filed on Jan. 19, 2017.

(51) Int. Cl.

| | |
|---|---|
| *H01S 3/06* | (2006.01) |
| *H01S 3/067* | (2006.01) |
| *H01S 3/23* | (2006.01) |
| *H01S 3/094* | (2006.01) |
| *H01S 3/16* | (2006.01) |
| *H01S 3/08* | (2006.01) |
| *H01S 3/102* | (2006.01) |

(52) U.S. Cl.
CPC .......... *H01S 3/06754* (2013.01); *H01S 3/067* (2013.01); *H01S 3/06704* (2013.01); *H01S 3/094042* (2013.01); *H01S 3/2308* (2013.01); *H01S 3/08045* (2013.01); *H01S 3/094003* (2013.01); *H01S 3/1028* (2013.01); *H01S 3/1608* (2013.01); *H01S 3/1618* (2013.01)

(58) Field of Classification Search
CPC ................. H01S 3/06754; H01S 3/067; H01S 3/094042; H01S 3/2308; H01S 3/1608; H01S 3/1618
See application file for complete search history.

(56) References Cited

U.S. PATENT DOCUMENTS

| | | | |
|---|---|---|---|
| 6,496,301 B1 * | 12/2002 | Koplow | G02B 6/14 359/337 |
| 9,214,781 B2 | 12/2015 | Honea et al. | |
| 9,325,151 B1 * | 4/2016 | Fini | H01S 3/102 |
| 9,507,084 B2 | 11/2016 | Fini et al. | |

\* cited by examiner

*Primary Examiner* — Armando Rodriguez
(74) *Attorney, Agent, or Firm* — Wendy W. Kobe, Esq.

(57) ABSTRACT

An optical gain fiber for use in high power (e.g., greater than 500 W pump power) is proposed that is configured to exhibit a minimum bend radius such that the bend loss for the propagating $LP_{01}$ mode is greater than about 0.03 dB/m. It has been discovered that this bend radius criteria, which is less stringent than that typically suggested in the art (e.g., bend loss less than about 0.03 dB/m), meets the modal stability requirements at high power operation, since the increase in operating temperature of the fiber laser or amplifier has been found to somewhat relax the bend radius requirement (which was heretofore only measured at "room temperature", not "operating temperature"). Modal stability is defined in terms of a reduced presence of unwanted higher-order modes (such as the $LP_{11}$ mode) in the amplified output signal.

13 Claims, 5 Drawing Sheets

GAIN FIBER FOR HIGH POWER LASERS AND AMPLIFIERS

CROSS-REFERENCE TO RELATED APPLICATIONS

This application claims the benefit of U.S. Provisional Application No. 62/448,279, filed Jan. 19, 2017 and herein incorporated by reference.

TECHNICAL FIELD

The present invention relates to an optical fiber particularly suited as a gain medium for a fiber-based optical laser or amplifier applications and, more particularly, to an optical gain fiber that provides high loss of unwanted higher-order modes (HOMs) so as to minimize modal instability within the gain fiber.

BACKGROUND OF THE INVENTION

The use of relatively high power pump light (e.g., about 500 W or more) within fiber-based lasers and amplifiers has introduced a new problem in the output efficiency of these devices. In particular, modal instability has been found to occur in these high power systems, where in this case modal instability takes the form of oscillations between the fundamental mode ($LP_{01}$) and a higher-order mode (typically the $LP_{11}$ mode) in the output signal from the gain fiber. Certainly, this modal instability is undesirable in high power applications that require a steady, stable output beam.

The modal interplay is facilitated by the elevated temperatures reached in the core region of a gain fiber during high power operation, which is attributed to quantum defect heating as pump light is converted into signal light within the rare-earth doped core of the gain fiber. A key to mitigating modal instability is to reduce the growth of power within the unwanted higher-order modes (HOMs), or to reduce the core temperature of the gain fiber, or both.

One way to reduce the possibility of modal instability is to increase the power loss (or reduce the gain) within the HOM beam. For example, it is possible to dope only a portion of the gain fiber, thus reducing the amount of gain introduced into the unwanted HOM beam. The obvious drawback of this approach is that a longer length of gain fiber is needed for complete pump absorption. Longer lengths of fiber are known to introduce nonlinear effects into the amplified optical signal and need to be avoided. Instead of doping only a portion of the gain fiber, it is possible to reduce the dopant concentration along the length of the fiber, reducing the core temperature of the gain fiber. This solution has the same undesirable result of also needing a relatively long length of gain fiber to achieve complete (or nearly complete) absorption of the pump beam.

Thus, a need remains in the art for a gain fiber configuration that is able to work at relatively high power levels without exhibiting modal instability. Said another way, the need remains for raising the power threshold at which modal stability occurs to a level beyond that currently utilized for fiber laser/amplifier systems.

SUMMARY OF THE INVENTION

The needs remaining in the prior art are addressed by the present invention, which relates to an optical fiber particularly suited as a gain medium for a fiber-based optical laser or amplifier and, more particularly to an optical gain fiber that provides high loss of unwanted higher-order modes (HOMs) so as to minimize modal instability within the gain fiber.

In accordance with one or more embodiments of the present invention, a gain fiber is proposed for high power applications that is configured to exhibit a coil geometry (either a varying-radius spiral or a constant-radius spool) having a bend loss value assessed at the high operating temperature associated with these high power laser and amplifier applications (as opposed to relying on room temperature-based bend loss values). Indeed, it has been discovered that the bend loss criteria for high power applications is less stringent than that typically suggested in the art (while maintaining the modal stability requirements), since the increase in operating temperature of the fiber laser or amplifier has been discovered to somewhat relax the bend radius requirement (which was heretofore only measured at "room temperature", not "operating temperature").

It is an additional aspect of the present invention that a spiral configuration of a gain fiber further relaxes the minimum bend radius (i.e., a bend radius at the input of a center-coupled spiral of about 0.014 dB/m) associated with maintaining modal stability, in as much as the spiral topology creates an arrangement where the amount of loss introduced to the optical signal decreases as the radius of the spiral increases.

One exemplary embodiment of the present invention takes the form of an optical gain fiber for use as gain medium in a high power optical system. In this embodiment, the optical gain fiber is defined as having an input endface and an output endface, with the optical gain fiber comprising a rare-earth doped core region and a cladding layer surrounding the rare-earth doped core region. The optical gain fiber disposed in a coil configuration with a minimum bend radius such that a room-temperature measured bend loss for a propagating $LP_{01}$ mode of an optical input signal is greater than 0.03 dB/m.

Another embodiment of the present invention may be defined as a fiber-based optical amplifying system comprising a pump source for providing an input pump beam operating at a predetermined wavelength (the input pump beam having an input power in excess of 500 W), a first optical fiber coupled to the pump source for propagating the input pump beam, another optical fiber supporting the transmission of an input optical signal, and an optical combiner receiving the input pump beam and the input optical signal. The optical combiner functions to combine these inputs for transmission along an output fiber. An optical gain fiber is coupled to the output fiber from the optical combiner. The optical gain fiber has a rare-earth doped core region where the input pump beam interacts with and amplifies the input optical signal. The optical gain fiber is disposed in a coil configuration with a minimum bend radius such that a room-temperature measured bend loss for a propagating $LP_{01}$ mode of at least one of the input optical signals is greater than 0.03 dB/m.

Other and further embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
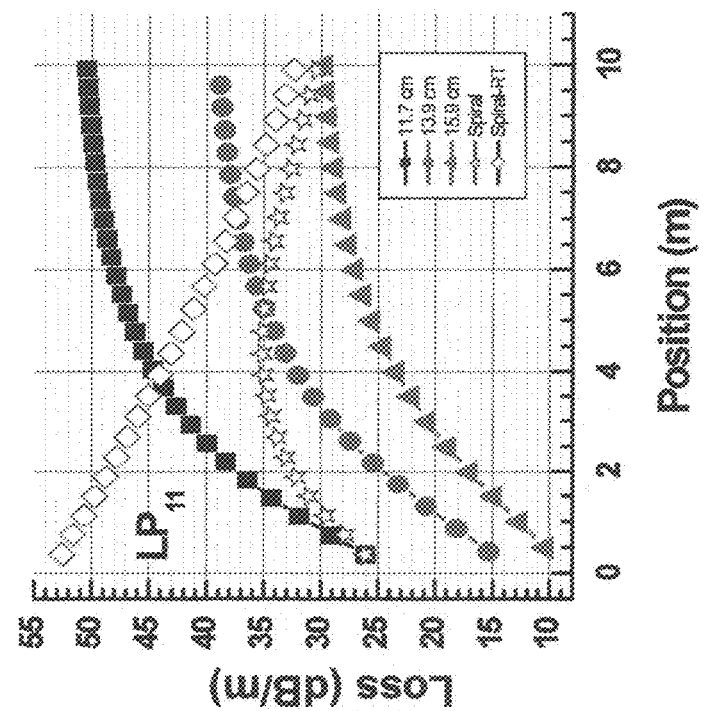
FIG. 1 contains plots of the calculated loss of the fundamental $LP_{01}$ mode for a variety of different bend radius values.

As mentioned above, one approach to limiting modal instability is to increase the loss experienced by the unwanted HOMs, which may be realized by increasing the bend loss in the gain fiber itself (i.e., decreasing the bend radius by coiling the gain fiber to a smaller diameter). However, an increase in HOM bend loss necessarily means that the desired fundamental mode ($LP_{01}$) output signal also experiences loss (the loss in the $LP_{01}$ mode at times defined as a loss in "device efficiency"). In as much as room temperature (RT) $LP_{01}$ bend loss values were used in the past to determine the minimum coil diameter associated with an acceptable drop in device efficiency, the design space utilized by system developers attempting to mitigate modal instability has inevitably been bruited by this $LP_{01}$ minimum bend loss coil value.

However, in accordance with the present invention, it has been discovered that this room temperature $LP_{01}$ minimum bend loss value as used in the past is inaccurate, and the acceptable bend loss can be significantly higher and still substantially reduce the likelihood of modal instability in the output signal. Moreover, it has been found that the unique properties associated with spiral gain fiber configurations allow for an even more relaxed restriction on minimum bend loss when the input signals are coupled into the center of the spiral (since the pump power level decreases as spiral diameter increases).

As will be discussed in detail below, these realizations relative to the increased design space for minimum bend loss values are attributed to the understanding of the increase in core temperature for high power laser/amplifier configurations. For the purposes of the present invention, powers in excess of about 500 W (perhaps extending beyond at least 5 kW) are considered, as "high power" for fiber laser or fiber amplifier systems. As mentioned above, the doped core region of the fiber used in a high power laser or amplifier will be heated, relative to the temperature of the surrounding cladding layer, as a result of quantum defect heating within the core region. The increase in core temperature will, in turn, raise the refractive index value of the core relative to the cladding (that is, an increase in $\Delta n$ between the refractive index of the core and the refractive index of the cladding). The increase in $\Delta n$ means that, a larger majority of the optical beams remain confined in the core region (more strongly guided). This increase in optical confinement means that optical power loss for the desired fundamental $LP_{01}$ mode and the unwanted HOMs (such as the $LP_{11}$ mode) are lower at higher core temperatures (with respect to room temperature losses). Additionally, it is known that the bend radius of a coiled gain fiber affects the loss experienced by the beam propagating through the fiber, where the tighter the coil (the smaller the bond radius), the higher the loss, FIGS. 1 and 2 are useful in understanding the relationship between pump power (core temperature), bend radius, and position along the gain fiber span.

FIG. 1 shows the calculated loss of the desired fundamental $LP_{01}$ mode along the length of a co-pumped fiber amplifier, using a gain fiber with a 17 μm mode field diameter. The losses are plotted for a set of fiber coil configurations (i.e., coil diameter), as will be discussed in detail below. FIG. 2 shows the calculated loss of the unwanted $LP_{11}$ mode as calculated under the same conditions. A 975 nm pump beans with an input power of 2.5 kW was used to provide amplification of an input optical information signal for each different coil configuration used in FIGS. 1 and 2, where the conversion of this high power pump beam into signal light is known to increase the temperature of the doped core region, as well as increase the $\Delta n$ between the core and cladding. As discussed above, the intent of the present invention is to minimize the power present in the unwanted, higher-order $LP_{11}$ mode (or any other HOM) so as to maintain the desired modal stability in the fundamental mode ($LP_{01}$) of an amplified output signal without unduly affecting $LP_{01}$ loss (i.e., without unduly a fleeting device efficiency).

Figure 2:
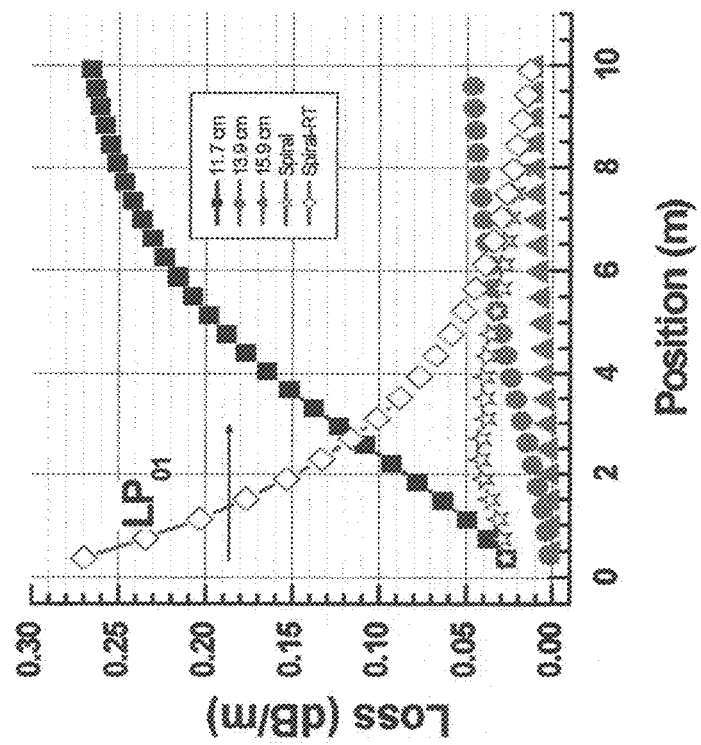
FIG. 2 contains plots similar to those of FIG. 1, but in this case showing the calculated loss for the unwanted $LP_{11}$ mode at these bend radius values.

The losses shown in the plots of FIGS. 1 and 2 were measured at the elevated operating temperature of the amplifier (i.e., the temperature associated with the use of a 2.5 kW pump power) for a set of different fiber coil geometries, including three conventional constant-radius coil (spool) geometries and a spiral (varying radius) geometry. For the constant-radius coils, a set of three different spool diameters were selected, one similar to the bend radius at the input of a spiral configuration, one similar to the bend radius at a mid-point of a spiral, and the third spool having a coil diameter similar the bend radius at the output of a spiral coil. In this case, the three values included a spool with a coil diameter of 11.7 cm, a second spool with a coil diameter of 13.9 cm, and a third spool with a coil diameter of about 15.9 cm. The losses were calculated along a fiber span of ten meters (where this span length is the "uncoiled" length of the gain fiber from its input endface to its output endface).

Since full pump power is present at the input of the gain fiber, the core temperature is highest at this point and losses (in both $LP_{01}$ and $LP_{11}$) are thus minimal. As the pump power is depleted along the length of the fiber, the core temperature will decrease. For tight coils, such as the 11.7 cm diameter spool, the $LP_{11}$ mode suppression as shown in FIG. 2 is significant (i.e., high values of loss). In particular, the loss experienced across this fiber span ranges from about 25 dB/m at the input to over 50 dB/m at the output. However, the $LP_{01}$ loss for this same coil diameter spool (as shown in FIG. 1) is unacceptably high (reaching over 0.25 dB/m at the output), resulting in low device efficiency. Larger-diameter coils lead to reduced suppression of the undesirable $LP_{11}$ mode, as shown for the 13.9 cm and 15.9 cm coil diameter results plotted in FIG. 2, perhaps allowing for the onset of modal instability. Yet, these two coil designs yield higher device efficiency in the fundamental $LP_{01}$ mode, as shown in FIG. 1, where the losses remain less than about 0.05 dB/m.

Figure 3:
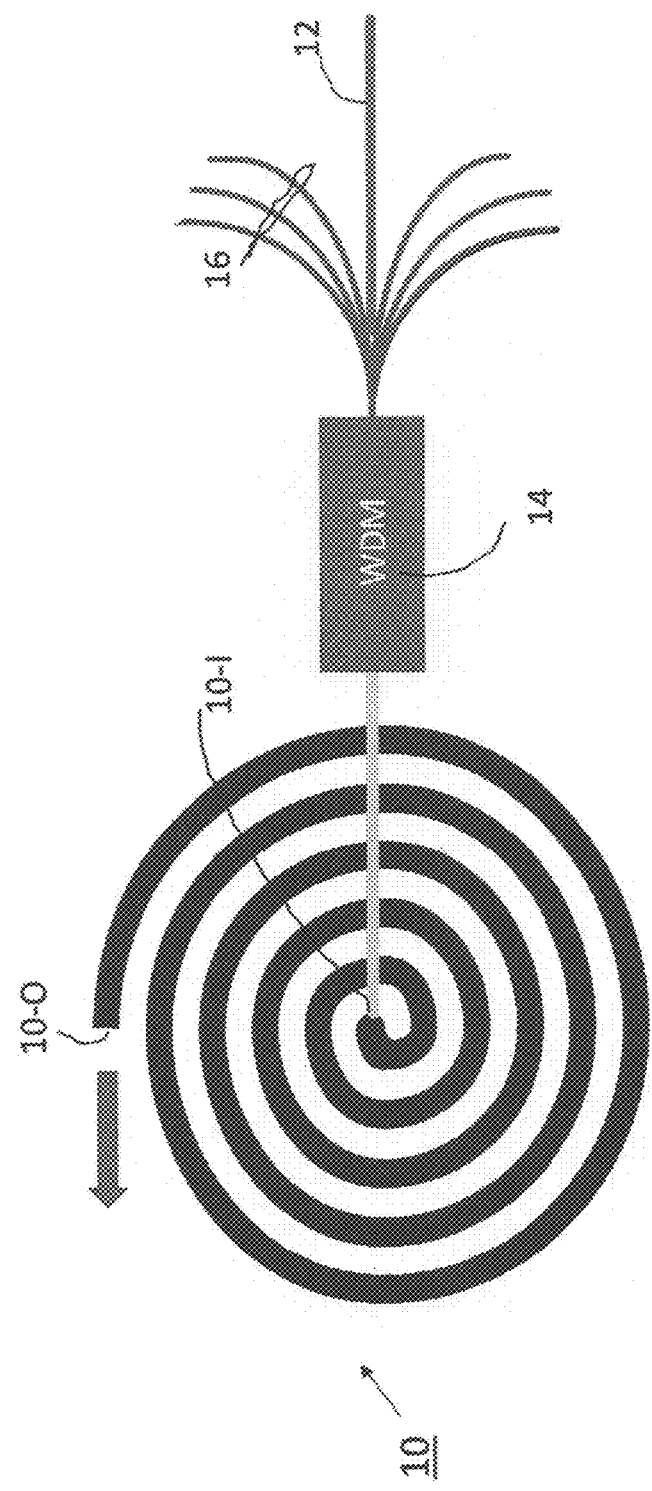
FIG. 3 is a simplified diagram of an exemplary center-coupled spiral configuration of an optical gain fiber.

Also plotted in FIGS. 1 and 2 are the losses associated with a spiral configuration of a section of gain fiber. It has been found that a spiral, which exhibits a constantly-changing bend radius as a function of length from its input to its output, is a preferred configuration for a gain fiber, since this provides maximum pump power at minimum bend radius, and by the time the bend radius is maximum at the output, the pump power is essentially depleted. FIG. 3 is a simplified diagram of an optical fiber gain arrangement including a section of optical gaits fiber 10 disposed in a spiral configuration. Thus particular spiral-configured gain fiber may be used in either a fiber laser or a fiber amplifier. Optical gain fiber 10 includes a rare-earth doped core region (not shown), which may use a rare-earth dopant such as erbium, ytterbium, or another suitable rare earth material to amplify an optical signal propagating along the gain fiber. An input optical signal (i.e., information-bearing signal) propagating along input fiber 12 is applied as an input to an optical combiner 14 (such as a wavelength-division multiplexer—WDM), and then introduced into an input end 10-I of optical gain fiber 10. One or more pump beams, operating at a suitable wavelength for providing amplification in gain fiber 10, are introduced along pump fiber(s) 16 and also applied as an input to WDM 14. The co-propagating pump beam(s) and optical information signal thus travel through gain fiber 10, where the pump is absorbed in the process of amplifying the information signal. As shown in FIG. 3, the amplified information signal exits at output end 10-O of gain fiber 10.

As mentioned above, the preferred center-coupled spiral geometry shown in FIG. 3 introduces an increasing bend radius along gain fiber 10 as a function of its length, which advantageously allows for the bend radius impact to be at a maximum when the optical signal power is at a minimum. That is, at input end 10-I, the bend radius is at its lowest value when the input signal is also at its lowest power level. As the input signal increases in power as it propagates along gain fiber 10, the bend radius may be increased without incurring significant power loss.

Returning to the plots of FIGS. 1 and 2, the respective $LP_{01}$ and $LP_{11}$ losses associated with a center-coupled spiral configuration are shown as being influenced by the competing factors of increasing bend radius and decreasing pump power. As shown, a maximum loss value for each mode is reached at a point somewhat mid-span of the gain fiber. This can be explained as the elevated temperature associated with conversion of the high power pump beam into signal light at the fiber input having a larger influence on the modal loss than the input bend radius (which is at a minimum at the input). As the pump power diminishes over the fiber span, the $\Delta n$ between core and cladding reduces and the increase in signal loss is more than offset by the decrease in bend loss associated with the increase in fiber radius as the spiral moves outward.

For the purposes of the present, invention, the room temperature (RT) plots associated with this center-coupled spiral configuration are included as well in FIGS. 1 and 2. As mentioned above, it is these RT values that designers have used in the past to determine the acceptable bend loss limits that achieve acceptable levels of design efficiency while minimizing modal instability. It is clear from comparing these RT plots to the actual operating temperature loss values that the RT values are not a valid presumption for defining the appropriate design space for high power fiber-based lasers and amplifiers. Indeed, these differences in bend loss between RT-calculated values and actual operating temperature values are now considered in accordance with the present invention to appropriately define range of appropriate bend loss values.

Figure 4:
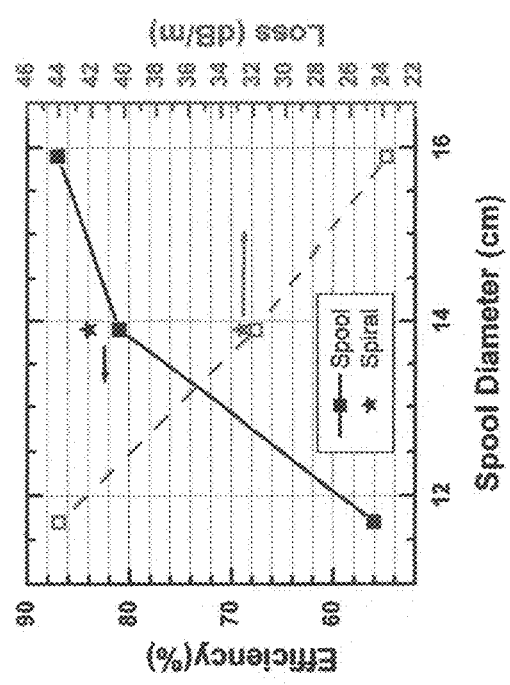
FIG. 4 is a graph showing the change in device efficiency and the $LP_{11}$ loss as a function of bend radius.

FIG. 4 shows the change in efficiency (along left-hand axis) of a fiber-based amplifier as a function of different bend conditions, and also shows the path average loss of the unwanted $LP_{11}$ mode (right-hand axis) as a function of these same bend conditions. The values associated with efficiency and $LP_{11}$ mode loss for a center-coupled spiral configuration are shown by asterisks in FIG. 4. It is clear that both efficiency and HOM suppression of a spiral fiber layout are superior to that of the constant average coil diameter. This is because the constant bend diameter of a coil causes high loss at the amplifier output where the serial power is the largest, whereas for a spiral, the loss is lowest where the signal power is highest.

Figure 5:
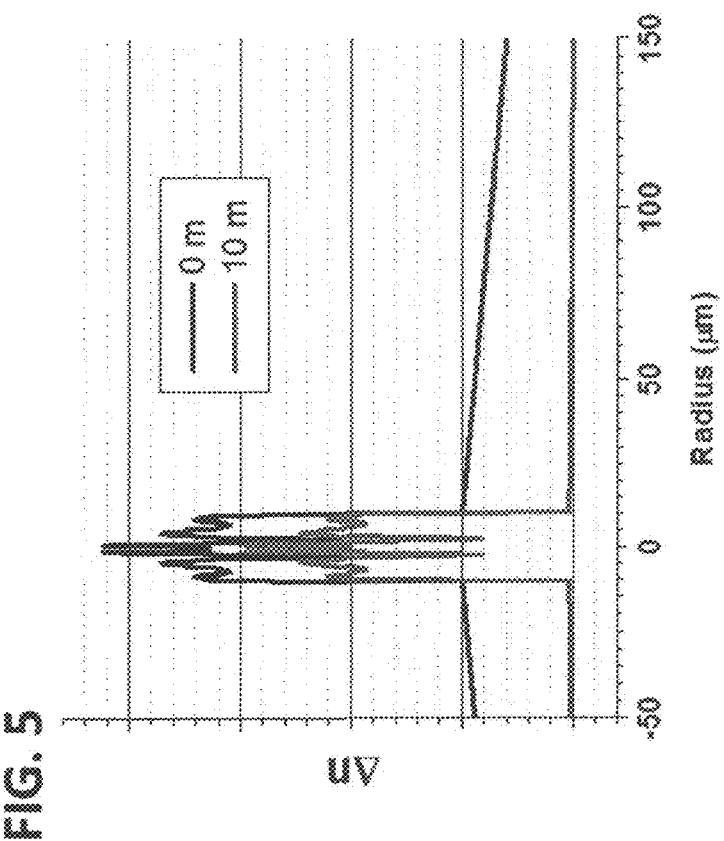
FIG. 5 plots refractive index profiles at the input and output of an optical gain fiber using a high power pump input.

As mentioned above, an optical gain fiber used in high power applications will exhibit an increase in temperature within its core region as a function of quantum defect heating. This core beating thus dominates the loss values at the fiber input, where the pump power is at its maximum. The core loses heat along the length of the fiber span as the pump power is depleted, allowing for the bend radius characteristic to begin, to dominate the loss exhibited by the propagating modes. FIG. 5 illustrates this effect, where graph A is a refractive index profile of gain fiber 10 at its input, end (such as input endface 10-I, shown in FIG. 3). Graph B is a refractive index profile of the same fiber at a distance of 10 meters from the input (such as at output endface 10-O, shown in FIG. 3). These values are associated with a pump power of 2.5 kW, which is a relatively high power pump known to significantly increase core region temperature along an input portion of the fiber span. The change in refractive index value ($\Delta n$) associated with this change in temperature between the input and the output of the gain fiber is clearly shown in FIG. 5. As mentioned above, higher $\Delta n$ values mean more signal (and pump) remains in the core, increasing device efficiency as compared to room temperature operation (at the expense of higher $LP_{11}$ power and the possibility of modal instability).

Figure 6:
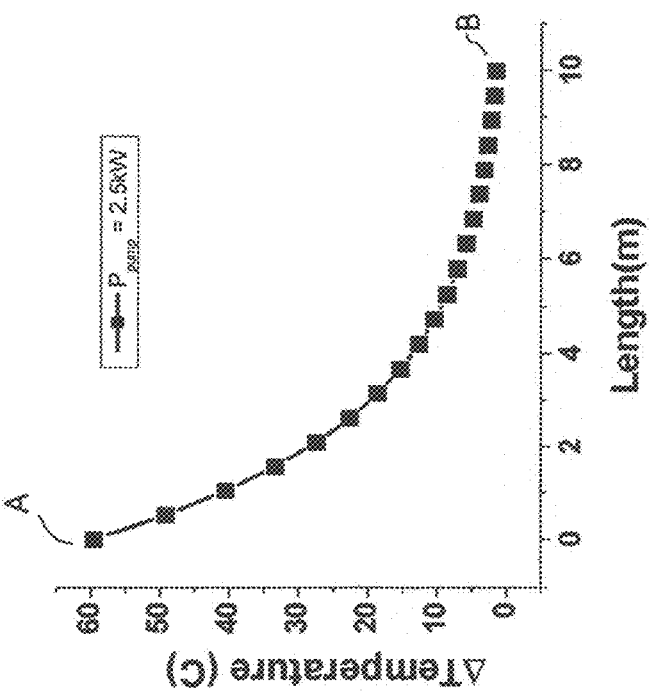
FIG. 6 plots the change in core temperature as a function position along the fiber span for the configured used in creating in the plots of FIG. 5.

FIG. 6 is graph showing the actual change in core temperature as a function of length along the gain fiber associated with the data of FIG. 5. This plot clearly shows the highest temperature at the input where the pump power is at a maximum, and with the core temperature thereafter decreasing along the length of the gain fiber span as the pump power is consumed.

In accordance with the present invention, the temperature-related characteristics are now understood in terms of gain fiber geometry to provide an arrangement that avoids modal instability, while maintaining as high an output power (device efficiency) of the information signal as possible.

Figure 7:
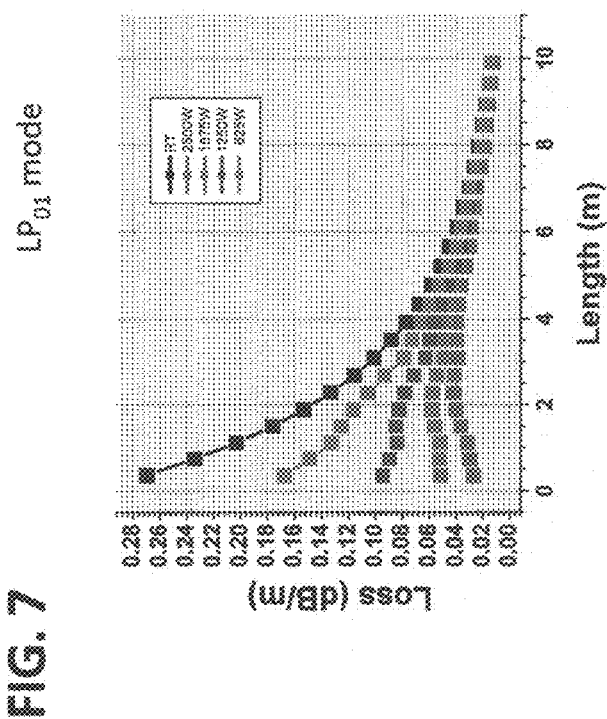
FIG. 7 includes a set of plots depicting $LP_{01}$ loss along a given span of gain fiber for a set of different input pump powers.

FIG. 7 depicts the understanding of the relationship between temperature and loss in accordance with the principles of the present invention. FIG. 7 is a graph of the loss experienced by the fundamental $LP_{01}$ mode of a propagating signal along a gain fiber disposed in the center-coupled spiral configuration as shown in FIG. 3. The individual plots are associated with different pump powers, ranging from a minimum pump power (and therefore lowest operating temperature) of 625 W to a maximum pump power of 2.5 kW (exhibiting the highest core temperature). It is to be understood that these power values are exemplary only, where for the purposes of the present invention "high power" laser and amplifier configurations are considered to operating at a power in excess of about 500 W. The RT loss (as depicted in FIG. 1) is also included in the graph of FIG. 7 for the sake of comparison.

It is clearly evident from the graph of FIG. 7 that as the pump power increases, the loss in the $LP_{01}$ signal decreases. Indeed, the difference between the "presumed" RT loss of about 0.27 dB/m is considerably greater than the 0.03 dB/m loss experienced when operating with a 2.5 kW pump power (i.e., "operating temperature" bend loss). Thus, the prior art presumption of limiting design parameters to bend radii associated with $LP_{01}$ acceptable loss at room temperature is clearly shown as improperly reducing the set of parameters available for system designers. In accordance with the present invention, therefore, it has been found that lower RT bend loss values can be utilized to determine minimum bend radius, since at elevated temperatures the loss values will raise.

Figure 8:
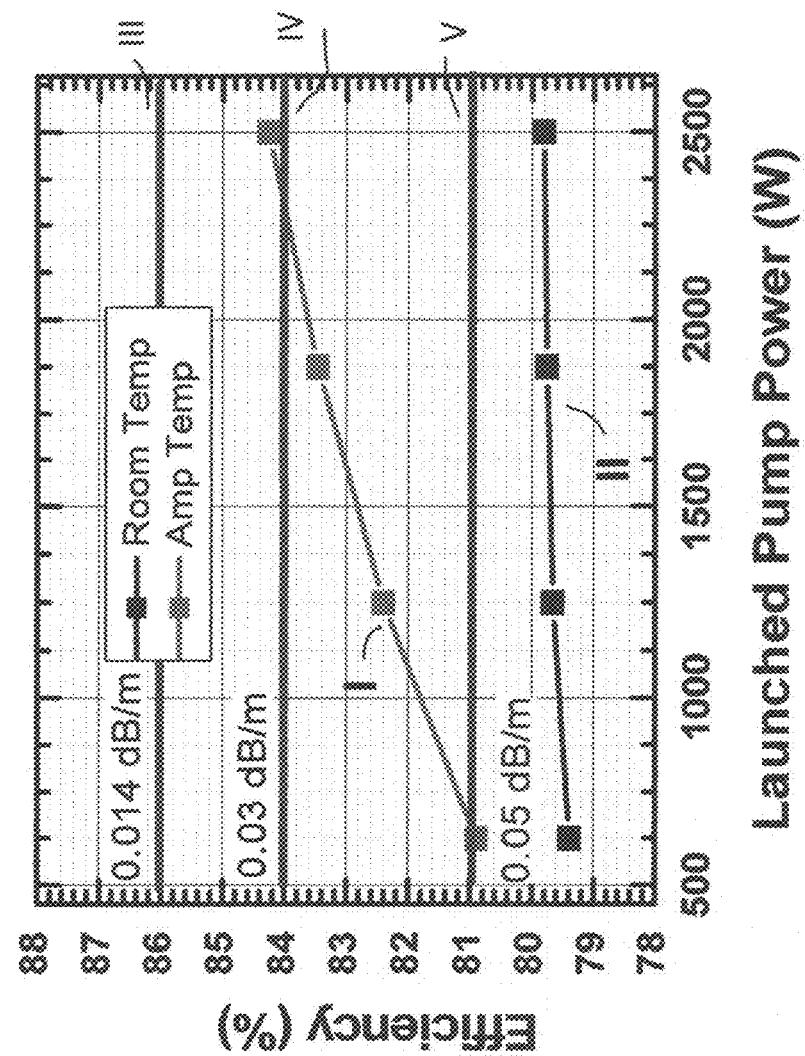
FIG. 8 is a graph of device efficiency as a function of launched pump power.

FIG. 8 is a graph of efficiency as a function of launched pump power for the center-coupled spiral configuration of an optical gain fiber. The actual device efficiency values calculated at the various pump powers is shown in Plot I, where the presumed RT values for these same pump powers are shown in Plot II. For the sake of comparison, horizontal, lines III, IV, and V are associated with efficiencies for three different coil (i.e., constant bend radius) configurations. These plots clearly show that at a 2.5 kW value of pump power, the efficiency of an amplifier is actually about 4% higher than that calculated from prescribed RT specifications for this same power. Indeed, this efficiency advantage will be even greater with the use of higher pump powers (e.g., 5 kW or higher). As a result, a larger number of potential designs are available, namely, designs with a higher room temperature loss (i.e., fibers with a smaller bend radius).

Thus, in accordance with the various teachings of the present invention, it is proposed to design gain fibers such that the RT loss of the fundamental $LP_{01}$ mode is coiled to a diameter such that the bend (total) loss is more than 0.03 dB/m at the minimum bend (or for the whole radius, if using a coil of constant bend radius). Such fibers are useful for mitigating modulation instability. It is further proposed that such a fiber be disposed in a spiral configuration in which the inside bend diameter at room temperature causes the fiber bend loss to be more than 0.014 dB/m.

While the foregoing description includes details that will enable those skilled in the art to practice the invention, it should be recognized that the description is illustrative in nature and that many modifications and variations thereof will be apparent to those skilled in the art having the benefit of these teachings. It is accordingly intended that the invention herein he defined solely by the claims appended hereto and that the claims be interpreted as broadly as permitted by the prior art.

What is claimed is:

1. An optical gain fiber for use as gain medium in a high power optical system, the optical gain fiber defined as having an input endface and an output endface, with the optical gain fiber comprising
   a rare-earth doped core region; and
   a cladding layer surrounding the rare-earth doped core region, the optical gain fiber disposed in a coil configuration with a minimum bend radius such that a room-temperature measured bend loss for a propagating $LP_{01}$ mode of an optical input signal is greater than 0.03 dB/m for an input pump power greater than 500 W.

2. The optical gain fiber as defined in claim 1 wherein the input pump power is greater than 2.5 kW.

3. The optical gain fiber as defined in claim 1 wherein the coil configuration comprises a spool exhibiting a constant bend radius.

4. The optical gain fiber as defined in claim 3 wherein the coil configuration has a spool diameter value of no less than about 2 cm.

5. The optical gain fiber as defined in claim 1 wherein the coil configuration comprises a spiral with a constantly-increasing bend radius, from a first input bend radius value to a second output bend radius value.

6. The optical gain fiber as defined in claim 5 wherein the spiral is configured as a center-coupled spiral, with the first input endface at a center location of the spiral, exhibiting a minimum bend radius and the second output endface at an exterior termination of the spiral, exhibiting a maximum bend radius.

7. A fiber-based optical amplifying system comprising
   a pump source for providing an input pump beam operating at a predetermined wavelength, the input pump beam having an input power in excess of 500 W;
   an input optical fiber supporting the propagation of at least one input optical signal;
   an optical combiner receiving the input pump beam and the input optical signal, thereafter combining the inputs for transmission along an output signal path; and
   an optical gain fiber coupled to the output signal path from the optical combiner, the optical gain fiber having a rare-earth doped core region where the input pump beam interacts with and amplifies the input optical signal, wherein the optical gain fiber is disposed in a coil configuration with a minimum bend radius such that a room-temperature measured bend loss for a propagating $LP_{01}$ mode of the at least one input optical signal is greater than 0.03 dB/m.

8. The fiber-based optical amplifying system as defined in claim 7 wherein the pump source provides a pump power greater than 2.5 kW.

9. The fiber-based optical amplifying system as defined in claim 7 wherein the optical gain fiber is disposed in a coil configuration is a spool with a constant bend radius.

10. The fiber-based optical amplifying system as defined in claim 7 wherein the optical gain fiber is configured as a center-coupled spiral, with the first input endface at a center location of the spiral, exhibiting a minimum bend radius and the second output endface at an exterior termination of the spiral, exhibiting a maximum bend radius.

11. The fiber-based optical amplifying system as defined in claim 7 wherein the system comprises a fiber-based optical amplifier.

12. The fiber-based optical amplifying system as defined in claim 7 wherein the system comprises a fiber-based laser.

13. An optical gain fiber for use as gain medium in a high power optical amplifying system, the optical gain fiber defined as having an input endface and an output endface, with the optical gain fiber comprising
   a rare-earth doped core region; and
   a cladding layer surrounding the rare-earth doped core region, the optical fiber disposed in a center-coupled spiral configuration exhibiting a bend radius that increases from the input endface to the output endface, the center-coupled spiral configuration having a minimum bend radius at the input endface such that a room-temperature measured bend loss for a propagating $LP_{01}$ mode of an optical input signal is no less than 0.014 dB/nm.

* * * * *